(12) United States Patent
Smith et al.

(10) Patent No.: US 11,995,401 B1
(45) Date of Patent: May 28, 2024

(54) SYSTEMS AND METHODS FOR IDENTIFYING A NAME

(71) Applicant: Strategic Coach, Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/141,441

(22) Filed: Apr. 30, 2023

(51) Int. Cl.
*G06F 16/35* (2019.01)
*G06F 40/268* (2020.01)
*G06F 40/279* (2020.01)
*G06F 40/40* (2020.01)

(52) U.S. Cl.
CPC .......... *G06F 40/279* (2020.01); *G06F 40/268* (2020.01); *G06F 40/40* (2020.01); *G06F 16/35* (2019.01)

(58) Field of Classification Search
CPC ....... G06F 40/279; G06F 40/40; G06F 40/268
See application file for complete search history.

(56) References Cited

U.S. PATENT DOCUMENTS

| | | |
|---|---|---|
| 10,043,409 B1 | 8/2018 | Nash |
| 10,824,940 B1 | 11/2020 | Rybakov |
| 11,348,813 B2 | 5/2022 | Liao |
| 2021/0103700 A1* | 4/2021 | Toplyn .................. G06N 20/00 |
| 2021/0173857 A1* | 6/2021 | Fume ................... G06F 16/337 |

* cited by examiner

*Primary Examiner* — Thomas H Maung
(74) *Attorney, Agent, or Firm* — Caldwell Intellectual Property Law

(57) ABSTRACT

Systems and methods for identifying a name are disclosed herein. In some embodiments, an apparatus may determine an attribute and/or attribute cluster. In some embodiments, an apparatus may determine a component word set as a function of an attribute and/or attribute cluster. In some embodiments, an apparatus may determine a candidate name by combining component words. In some embodiments, an apparatus may determine an intelligibility rating and/or an appeal rating for a candidate name.

18 Claims, 7 Drawing Sheets

SYSTEMS AND METHODS FOR IDENTIFYING A NAME

FIELD OF THE INVENTION

The present invention generally relates to the field of machine learning. In particular, the present invention is directed to systems and methods for identifying a name.

BACKGROUND

Computerized processes often rely on labels for data describing phenomena, or for the phenomena themselves. However, automated generation of labels tends to be overly formulaic for ease of use by users, and generation of user-intelligible labels tends to be inefficient and ineffective at avoiding semantic collision.

SUMMARY OF THE DISCLOSURE

In an aspect, an apparatus for identifying a name includes at least a processor; and a memory communicatively connected to the at least processor, the memory containing instructions configuring the at least processor to identify an attribute cluster as a function of the entity data; determine a component word set as a function of an attribute cluster, using a component word set machine learning model; determine a candidate name set as a function of the component word set; identify a name from the candidate name set, using a name identification machine learning model; and determine a visual element data structure as a function of the name.

In another aspect, a method of identifying a name includes using at least a processor, identifying an attribute cluster as a function of the entity data; using at least a processor, determining a component word set as a function of the attribute cluster, using a component word set machine learning model; using at least a processor, determining a candidate name set as a function of the component word set; using at least a processor, identifying a name from the candidate name set, using a name identification machine learning model; and using at least a processor, determining a visual element data structure as a function of the name.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for identifying a name. In some embodiments, one or more attributes and/or attribute clusters of an entity are determined. In some embodiments, one or more component words are determined based on those attributes and/or attribute clusters. In some embodiments, a candidate name is determined by combining one or more component words. In some embodiments, an intelligibility rating and an appeal rating may be determined for a candidate name. In some embodiments, a name may be determined as a function of an intelligibility rating and an appeal rating.

Figure 1:
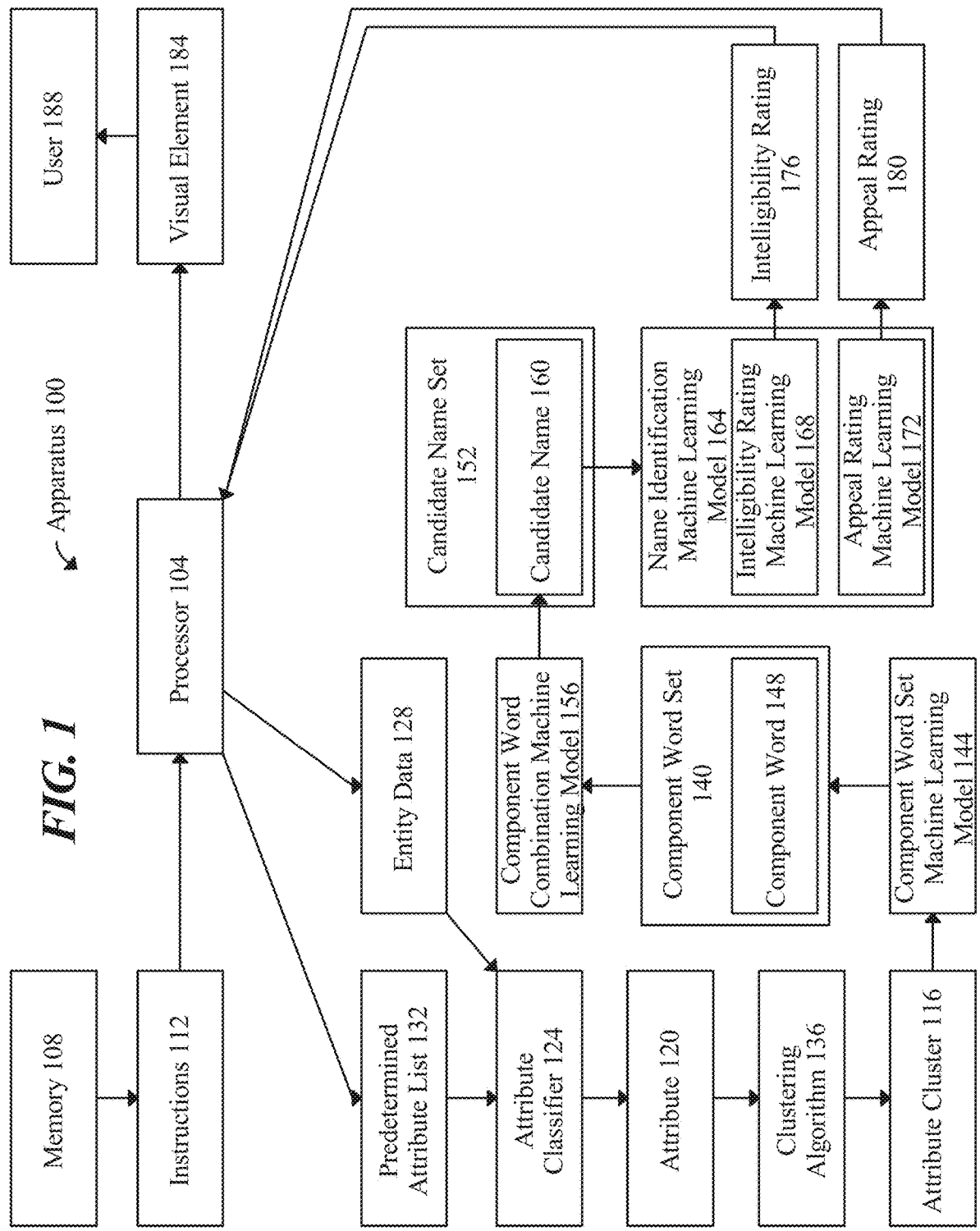
FIG. 1 is a diagram depicting an apparatus for identifying a name.

Referring now to FIG. 1, an exemplary embodiment of an apparatus 100 for identifying a name is illustrated. Apparatus 100 may include a computing device. Apparatus 100 may include a processor. Processor may include, without limitation, any processor described in this disclosure. Processor may be included in a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

Still referring to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, in some embodiments, apparatus 100 may include at least a processor 104 and a memory 108 communicatively connected to the at least a processor 104, the memory 108 containing instructions 112 configuring the at least a processor 104 to perform one or more processes described herein. Computing devices including memory 108 and at least a processor 104 are described in further detail herein.

Still referring to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, in some embodiments, apparatus 100 may identify an attribute cluster 116. In some embodiments, apparatus 100 may include at least a processor 104 and a memory 108 communicatively connected to the at least processor 104, the memory 108 containing instructions 112 configuring the at least processor 104 to identify an attribute cluster 116.

Still referring to FIG. 1, as used herein, an "attribute cluster" is a plurality of related attributes of an entity. In non-limiting examples, an entity may include a person or a company. An attribute 120 may include any or all of a feature, section, knowledge, asset, or skill of an entity. In non-limiting examples, if an entity is a company, attribute 120 may include a branch of the company or a particular area of expertise of employees of the company. Attribute cluster 116 may include a single attribute 120 of the entity, or it may include more than one attribute 120. Attribute cluster 116 may include multiple related attributes 120. In a non-limiting example, attribute cluster 116 may include knowledge of how to paint and an inventory of paintbrushes. In another non-limiting example, attribute cluster 116 may include knowledge of how to use several computer programs, each useful for an aspect of creating virtual artwork. In another non-limiting example, attribute cluster 116 may include knowledge of how to use a single computer program.

Still referring to FIG. 1, in some embodiments, apparatus 100 may identify a plurality of attributes 120 by using attribute classifier 124. Attribute classifier 124 may receive as inputs entity data 128 and predetermined attribute list 132 and may output attribute 120. Attribute classifier 124 may be trained on a dataset including historical entity data associated with historical attributes. As a non-limiting example, attribute classifier 124 may be trained on a dataset including, for each historical entity in the dataset, historical entity data associated with which computer programs employees of that entity had expertise in; attribute classifier 124 trained on such data may be capable of associating entity data 128 with attributes 120, where the attributes 120 include which computer programs employees of the entity have expertise in. As another non-limiting example, attribute classifier 124 may be trained on a dataset including, for each historical entity in the dataset, historical entity data associated with which physical assets such as machines and land that entity possessed; attribute classifier 124 trained on such data may be capable of associating entity data 128 with attributes 120, where the attributes 120 include which physical assets an entity possesses. As another non-limiting example, attribute classifier 124 may be trained on a dataset including, for each historical entity in the dataset, historical entity data associated with which languages employees of that entity spoke; attribute classifier 124 trained on such data may be capable of associating entity data 128 with attributes 120, where the attributes 120 include which languages employees of an entity speak. Entity data may be processed before it is input into attribute classifier 124, such as using optical character recognition, a language model, and/or data type conversions as described below. Attribute classifier 124 may also accept as an input predetermined attribute list 132 and may associate entity data 128 with attributes 120 on the predetermined attribute list 132.

Still referring to FIG. 1, in some embodiments, apparatus 100 may receive entity data 128 from an entity data source. As used herein, "entity data" is data associated with an entity. Entity data 128 may include, in non-limiting examples, a description of the entity, social media discussions of the entity, audit reports discussing the entity, job descriptions of entity employees, resumes of entity employees, and financial reports discussing the entity. In some embodiments, an entity data source may include a computing device such as a smartphone, tablet, or computer, that accepts human data input. An entity data source may include, without limitation, one or more of a device capable of receiving audio information, a device capable of receiving visual information, a device capable of receiving manual user input, or a device capable of digitizing physical documents. An entity data source may include, without limitation, one or more of a microphone, camera, keyboard, computer mouse, smartphone, controller, touchscreen, button, switch, or scanner. In some embodiments, an entity data source may include a display, such as a screen. In some embodiments, an entity data source may include a graphical user interface. As used herein, a "graphical user interface" (GUI) is a graphical form of user interface that allows users to interact with electronic devices. In some embodiments, entity data 128 may be database. In some embodiments, processor 104 may request entity data 128 from an application programming interface (API) associated with a database and may receive entity data 128 from a computing device associated with the database.

Still referring to FIG. 1, in some embodiments, an entity data source may include a web crawler or may store entity data obtained using a web crawler. A web crawler may be configured to automatically search and collect information related to a user. A "web crawler," as used herein, is a program that systematically browses the internet for the purpose of web indexing. The web crawler may be seeded with platform URLs, wherein the crawler may then visit the next related URL, retrieve the content, index the content, and/or measures the relevance of the content to the topic of interest. In one embodiment, the web crawler may be configured to scrape entity data from entity related social media and networking platforms. The web crawler may be trained with information received from an entity through a digital interface. As a non-limiting example, an entity employee may input into a digital interface, social media platforms the entity has accounts on and would like to retrieve entity data from. A digital interface may include a graphical user interface (GUI), command line interface (CLI), menu-driven user interface, touch user interface, voice user interface (VUI), form-based user interface, and the like. Processor may receive entity data including information such as an entity's name, profile, platform handles, platforms associated with the entity, descriptions of activities undertaken by entity, descriptions of products or services offered by entity, descriptions of achievements of entity employees, profiles of entity employees, business partners associated with entity, and the like. In some embodiments, a web crawler may be configured to generate a web query. A web query may include search criteria. Search criteria may include entity account handles, employee account handles, web page addresses and the like received from the entity. A web crawler function may be configured to search for and/or detect one or more data patterns. A "data pattern" as used in this disclosure is any repeating forms of information. A data pattern may include, but is not limited to, features, phrases, and the like as described further below in this disclosure. The web crawler may work in tandem with a machine-learning model, digital processing technique utilized by a processor, and the like as described in this disclosure. In some embodiments, a web crawler may be configured to determine the relevancy of a data pattern. Relevancy may be determined by a relevancy score. A relevancy score may be automatically generated by processor 104, received from a machine learning model, and/or received from the user. In some embodiments, a relevancy score may include a range of numerical values that may correspond to a relevancy strength of data received from a web crawler function. As a non-limiting example, a web crawler function may search the Internet for data related to entity employees. In some embodiments, computing device may determine a relevancy score of entity data retrieved by a web crawler.

Still referring to FIG. 1, in some embodiments, entity data may include image data, which may be processed using optical character recognition or optical character reader technology. In some embodiments, optical character recognition or optical character reader (OCR) includes automatic conversion of images of written (e.g., typed, handwritten or printed text) into machine-encoded text. In some cases, recognition of at least a keyword from image data may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image data. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image data to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image data. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image data.

Still referring to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of image data. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into at least a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIGS. 2-4. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. A first pass may try to recognize a character. Each character that is satisfactory is passed to an adaptive classifier as training data. The adaptive classifier then gets a chance to recognize characters more accurately as it further analyzes image data. Since the adaptive classifier may have learned something useful a little too late to recognize characters on the first pass, a second pass is run over the image data. Second pass may include adaptive recognition and use characters recognized with high confidence on the first pass to recognize better remaining characters on the second pass. In some cases, two-pass approach may be advantageous for unusual fonts or low-quality image data. Another exemplary OCR software tool include OCRopus. OCRopus development is led by German Research Centre for Artificial Intelligence in Kaiserslautern, Germany. In some cases, OCR software may employ neural networks.

Still referring to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of image data. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, in some embodiments, OCR may be used to convert entity data in the form of image files to text files. In a non-limiting example, OCR may be used to produce a text file from an image or PDF of a description of skills of particular employees. Entity data converted to text using OCR may then be interpreted or modified by a language model. Entity data converted to text using OCR may be input into attribute classifier 124. As a non-limiting example, attribute classifier 124 may only accept inputs in a text format, and entity data may be converted into that format such that it may be effectively input into attribute classifier 124.

Still referring to FIG. 1, in some embodiments, a language model may be used to process entity data. As used herein, a "language model" is a program capable of interpreting natural language, generating natural language, or both. In some embodiments, a language model may be configured to interpret the output of an automatic speech recognition function and/or an OCR function. A language model may include a neural network. A language model may be trained using a dataset that includes natural language. In non-limiting examples, such a dataset may be obtained from publicly available sources such as social media sites.

Still referring to FIG. 1, generating language model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, processor 104 may determine one or more language elements in entity data by identifying and/or detecting associations between one or more language elements (including phonemes or phonological elements, morphemes or morphological elements, syntax or syntactic elements, semantics or semantic elements, and pragmatic elements) extracted from at least user data and/or response, including without limitation mathematical associations, between such words. Associations between language elements and relationships of such categories to other such term may include, without limitation, mathematical associations, including without limitation statistical correlations between any language element and any other language element and/or Language elements. Processor 104 may compare an input such as a sentence from entity data with a list of keywords or a dictionary to identify language elements. For example, processor 104 may identify whitespace and punctuation in a sentence and extract elements comprising a string of letters, numbers or characters occurring adjacent to the whitespace and punctuation. Processor 104 may then compare each of these with a list of keywords or a dictionary. Based on the determined keywords or meanings associated with each of the strings, processor 104 may determine an association between one or more of the extracted strings and a feature of an organization operating apparatus 100, such as an association between a string containing the word "expertise" and a strength of an entity. Associations may take the form of statistical correlations and/or mathematical associations, which may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory.

Still referring to FIG. 1, processor 104 may be configured to determine one or more language elements in entity data using machine learning. For example, processor 104 may generate the language processing model by any suitable method, including without limitation a natural language processing classification algorithm; language processing model may include a natural language process classification model that enumerates and/or derives statistical relationships between input terms and output terms. An algorithm to generate language processing model may include a stochastic gradient descent algorithm, which may include a method that iteratively optimizes an objective function, such as an objective function representing a statistical estimation of relationships between terms, including relationships between input language elements and output patterns or conversational styles in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted word, phrase, and/or other semantic unit. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Still referring to FIG. 1, processor 104 may be configured to determine one or more language elements in entity data using machine learning by first creating or receiving language classification training data. Training data may include data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below.

Still referring to FIG. 1, language classification training data may be a training data set containing associations between language element inputs and associated language element outputs. Language element inputs and outputs may be categorized by communication form such as written language elements, spoken language elements, typed language elements, or language elements communicated in any suitable manner. Language elements may be categorized by component type, such as phonemes or phonological elements, morphemes or morphological elements, syntax or syntactic elements, semantics or semantic elements, and pragmatic elements. Associations may be made between similar communication types of language elements (e.g. associating one written language element with another written language element) or different language elements (e.g. associating a spoken language element with a written representation of the same language element). Associations may be identified between similar communication types of two different language elements, for example written input consisting of the syntactic element "that" may be associated with written phonemes /th/, /ă/, and /t/. Associations may be identified between different communication forms of different language elements. For example, the spoken form of the syntactic element "that" and the associated written phonemes above. Language classification training data may be created using a classifier such as a language classifier. An exemplary classifier may be created, instantiated, and/or run using processor 104, or another computing device. Language classification training data may create associations between any type of language element in any format and other type of language element in any format. Additionally, or alternatively, language classification training data may associate language element input data to a feature related to an operator of apparatus 100. For example, language classification training data may associate occurrences of the syntactic elements "expert," "python," and "programming," in a single sentence with the feature of expertise in the programming language python.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Still referring to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, a language model may be used to process entity data for input into attribute classifier 124. In a non-limiting example, entity data may include descriptions of entity attributes using a variety of words, and a language model may be used to modify those descriptions such that they use consistent language. In a non-limiting example, entity data may include manager-written descriptions of employees, which may use the words "expert," "specialist," and "talented" to indicate skill in a particular field; a language model may be used to identify these words as similar and replace them with a single word. Such a modified element of entity data may be input into attribute classifier 124.

Still referring to FIG. 1, in some embodiments, apparatus 100 may receive predetermined attribute list 132 from a predetermined attribute list source. A predetermined attribute list source may include a computing device associated with entity, such as a computing device described as a potential entity data source above. In some embodiments, processor 104 may determine predetermined attribute list 132. A processor may determine predetermined attribute list 132 as a function of entity data 128. In a non-limiting example, entity data may include a selection of attributes 120 entity would like to have analyzed, and processor 104 may determine predetermined attribute list 132 as a function of those attributes 120. In another non-limiting example, entity data may include which industry entity is in, and processor 104 may determine predetermined attribute list 132 as a function of that industry.

Still referring to FIG. 1, in some embodiments, apparatus 100 may identify an attribute cluster 116 by using a clustering algorithm 136. Clustering algorithm 136 may be implemented, as a non-limiting example, using a k-means clustering algorithm. A "k-means clustering algorithm" as used in this disclosure, includes cluster analysis that partitions n attributes 120 into k clusters in which each attribute 120 belongs to the cluster with the nearest mean, using, for instance a training set described below. "Cluster analysis" as used in this disclosure, includes grouping a set of attributes 120 in way that attributes 120 in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each attribute 120 belongs to a cluster or not. Cluster analysis may include soft clustering or fuzzy clustering whereby each attribute 120 belongs to each cluster to a certain degree such as for example a likelihood of belonging to a cluster; for instance, and without limitation, a fuzzy clustering algorithm may be used to identify clustering of gene combinations with multiple disease states, and vice versa. Cluster analysis may include strict partitioning clustering whereby each attribute 120 belongs to exactly one cluster. Cluster analysis may include strict partitioning clustering with outliers whereby attributes 120 may belong to no cluster and may be considered outliers. Cluster analysis may include overlapping clustering whereby attributes 120 may belong to more than one cluster. Cluster analysis may include hierarchical clustering whereby attributes 120 that belong to a child cluster also belong to a parent cluster. In some embodiments, an attribute cluster may include an outlier cluster as described in U.S. patent application Ser. No. 18/141,296, filed on Apr. 28, 2023, and titled "SYSTEMS AND METHODS FOR DATA STRUCTURE GENERATION," the entirety of which is hereby incorporated by reference.

Still referring to FIG. 1, computing device may generate a k-means clustering algorithm receiving unclassified attributes 120 and outputs a definite number of classified attribute clusters 116 wherein the attribute clusters 116 each contain one or more attributes 120. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified attribute cluster 116. K-means clustering algorithm may select and/or be provided "k" variable by calculating k-means clustering algorithm for a range of k values and comparing results. K-means clustering algorithm may compare results across different values of k as the mean distance between cluster attributes 120 and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify attribute clusters 116 containing attributes 120.

Still referring to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids $c_i$ of centroids in set C. Unclassified data may be assigned to a cluster based on $\text{argmin}_{ci \ni C} \text{dist}(ci, x)^2$, where argmin includes argument of the minimum, ci includes a collection of centroids in a set C, and dist includes standard Euclidean distance. K-means clustering module may then recompute centroids by taking mean of all cluster attributes 120 assigned to a centroid's cluster. This may be calculated based on $ci = 1/|Si|\Sigma xi \ni Si^{xi}$. K-means clustering algorithm may continue to repeat these calculations until a stopping criterion has been satisfied such as when cluster attributes 120 do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each attribute cluster 116 generated by k-means clustering algorithm and a selected attribute 120. Degree of similarity index value may indicate how close a particular attribute 120 is to being classified by k-means algorithm to a particular cluster. K-means clustering algorithm may evaluate the distances of the attribute 120 to the k-number of clusters output by k-means clustering algorithm. Short distances between a set of attributes 120 and a cluster may indicate a higher degree of similarity between the attribute 120 and a particular cluster. Longer distances between attribute 120 and a cluster may indicate a lower degree of similarity between attribute 120 and a particular cluster.

Still referring to FIG. 1, k-means clustering algorithm selects a classified attribute 120 as a function of the degree of similarity index value. In an embodiment, k-means clustering algorithm may select an attribute cluster 116 with the smallest degree of similarity index value indicating a high degree of similarity between attribute 120 and the attribute cluster 116. Alternatively, or additionally k-means clustering algorithm may select a plurality of clusters having low degree of similarity index values to attributes 120, indicative of greater degrees of similarity. Degree of similarity index values may be compared to a threshold number indicating a minimal degree of relatedness suitable for inclusion of attribute 120 in a cluster, where degree of similarity indices a-n falling under the threshold number may be included as indicative of high degrees of relatedness. The above-described illustration of feature learning using k-means clustering is included for illustrative purposes only and should not be construed as limiting potential implementation of clustering algorithms; persons skilled in the art, upon reviewing the entirety of this disclosure, will be aware of various additional or alternative clustering approaches that may be used consistently with this disclosure.

Still referring to FIG. 1, in some embodiments, a k-means clustering algorithm may be trained on a dataset including a plurality of attributes that vary in one or more dimensions. In a non-limiting example, a set of attributes may include expertise in a variety of computer programs, and a variable may include the degree to which expertise in a computer program is correlated with the number of papers an individual with that expertise has written in a particular field; in this situation, a k-means clustering algorithm may be used to determine clusters among the training data, and attributes input into the algorithm may be assigned to these attribute clusters.

Still referring to FIG. 1, in some embodiments, particle swarm optimization is used to determine attribute clusters 116. In some embodiments, particle swarm optimization 116. In some embodiments, particle swarm optimization may involve a population of candidate solutions that are moved around in a search space as a function of the best-known position for that particle and the entire population's best-known position.

Still referring to FIG. 1, in some embodiments, apparatus 100 may determine a component word set 140 as a function of attribute cluster 116. In some embodiments, apparatus 100 may include at least a processor 104 and memory 108 communicatively connected to the at least processor 104, the memory 108 containing instructions 112 configuring the at least processor 104 to determine a component word set 140 as a function of attribute cluster 116.

Still referring to FIG. 1, in some embodiments apparatus 100 may determine a component word set 140 as a function of attribute cluster 116 using a component word set machine learning model 144. As used herein, a "component word" is a word with a desired level of relatedness with respect to an attribute or attribute cluster. In some embodiments, component word set machine learning model 144 may include an unsupervised machine learning model trained to recognize associations between words. In a non-limiting example, component word set machine learning model 144 may be trained on a dataset including samples of text and may be trained to recognize associations between words. In a non-limiting example, component word set machine learning model 144 may be trained to recognize associations between words as a function of how frequently words are used together. In some embodiments, component word set machine learning model 144 may accept as an input a plurality of words and may output association ratings between those words. In a non-limiting example, component word set machine learning model 144 may accept as an input two words and may output an association rating between those words. An association rating may be a number, such as a number between 0 and 1. In some embodiments, component word set machine learning model 144 may accept as an input one or more words and may output one or more words that are sufficiently associated with the input words; such a component word set machine learning model 144 may also output association ratings between the input and output words. In a non-limiting example, component word set machine learning model 144 may accept as an input a single word and may output a plurality of words, and association ratings between the input word and each of the output words.

Still referring to FIG. 1, in some embodiments, processor 104 may input into component word set machine learning model 144 a word associated with attribute 120 and/or attribute cluster 116. In some embodiments, a word input into component word set machine learning model 144 may be a word associated with multiple attributes 120 in an attribute cluster 116. In a non-limiting example, attribute cluster 116 may include attributes 120 on expertise with several programming languages; in such a situation, a word associated with all of those programming languages may be input into component word set machine learning model 144. In some embodiments, attribute 120 and/or attribute cluster 116 may be associated with a title and/or description. In some embodiments, a word input into component word set machine learning model 144 may be a word included in a description or title of attribute 120 and/or attribute cluster 116. In a non-limiting example, attribute cluster 116 may have the title "expertise in python" and the word "python" may be input into component word set machine learning model 144. In some embodiments, a word associated with attribute 120 and/or attribute cluster 116 and input into component word set machine learning model 144 is a word from predetermined attribute list 132. In some embodiments, a word associated with attribute 120 and/or attribute cluster 116 and input into component word set machine learning model 144 is a word manually selected and/or input by a human as a word associated with attribute 120 and/or attribute cluster 116.

Still referring to FIG. 1, in some embodiments, processor 104 may determine whether a word is to be included in component word set 140 as a function of an association rating. In some embodiments, an association rating is compared to a threshold. In a non-limiting example, processor 104 may determine to include a word in component word set 140 if an association rating between it and a word input into component word set machine learning model 144 indicates a sufficiently strong association. In another non-limiting example, processor 104 may determine to include a word in component word set 140 if an association rating between it and a word associated with attribute cluster 116 indicates a sufficiently strong association. In another non-limiting example, processor 104 may determine to include a word in component word set 140 if an association rating between it and a word associated with attribute cluster 116 indicates a sufficiently weak association. In another non-limiting example, processor 104 may determine to include a word in component word set 140 if an association rating between it and a word associated with attribute cluster 116 indicates an association strength between a maximum and a minimum.

Still referring to FIG. 1, in some embodiments, component word set machine learning model 144 may input a first word from a predetermined word set and a second word associated with attribute 120 and/or attribute cluster 116 and may output a component word 148 and/or component word set 140. In some embodiments, apparatus 100 may receive predetermined word set from a predetermined word set source. A predetermined word set source may include a computing device associated with entity, such as a computing device described as a potential entity data source and/or predetermined attribute list source above. In some embodiments, processor 104 may determine predetermined word set. In non-limiting examples, processor may determine predetermined word set as a function of entity data 128. In a non-limiting example, entity data may include a selection of words entity would like to have analyzed, and processor 104 may determine predetermined word set as a function of those words.

Still referring to FIG. 1, in some embodiments, apparatus 100 may determine a candidate name set 152 as a function of component word set 140. In some embodiments, apparatus 100 may include at least a processor 104 and memory 108 communicatively connected to the at least processor 104, the memory 108 containing instructions 112 configuring the at least processor 104 to determine a candidate name set 152 as a function of component word set 140.

Still referring to FIG. 1, as used herein, a "candidate name" is a combination of at least two component words. In some embodiments, candidate name 160 may include a combination of words in component word set 140. In some embodiments, candidate name 160 may include a portmanteau of words in component word set 140. In some embodiments, candidate name 160 may include a series of words in component word set 140. In a non-limiting example, if the words "international" and "learning" are in component word set 140, then candidate name 160 may include "interlearn," "international learn," or "learning international."

Still referring to FIG. 1, in some embodiments apparatus 100 may determine candidate name 160 as a function of component word set 140 using a component word combination machine learning model 156. In some embodiments, a component word combination machine learning model 156 may accept as inputs a plurality of component words 148 and may output a candidate name 160.

Still referring to FIG. 1, in some embodiments, component word combination machine learning model 156 may be trained using reinforcement learning. In some embodiments, component word combination machine learning model 156 may be trained to maximize or minimize a score assigned to component word combination machine learning model 156 outputs. In some embodiments, component word combination machine learning model 156 outputs may be assigned a score based on how well the output conforms to language rules, patterns, and the like. In a non-limiting example, if a component word combination machine learning model 156 output is in English and uses too many consonants in a row, then that output may be assigned an unfavorable score. In another non-limiting example, if a component word combination machine learning model 156 output is in English and the subject of a descriptor and the descriptor are in the wrong order, then that output may be assigned an unfavorable score; in a non-limiting example, if input words are "green" and "skyscraper," then the output "green skyscraper" may be given a better score than "skyscraper green."

Still referring to FIG. 1, in some embodiments, component word combination machine learning model 156 may be trained using supervised learning. In some embodiments, component word combination machine learning model 156 may be trained on a data set including words associated with combinations of those words. In a non-limiting example, word combination machine learning model 156 may be trained on a data set including an element of data including component words "side" and "walk," associated with words formed from combinations of those words such as "sidewalk."

Still referring to FIG. 1, in some embodiments, component word combination machine learning model 156 may output one or more combination words, and measures of quality associated with those combination words. In some embodiments, processor 104 may determine words output from component word combination machine learning model 156 to be candidate names 160 based on a comparison between a threshold and a measure of quality output by component word combination machine learning model 156. In non-limiting examples, processor 104 may determine words output from component word combination machine learning model 156 to be candidate names 160 based on whether an associated measure of quality is greater than a threshold, less than a threshold, or between a maximum and a minimum.

Still referring to FIG. 1, in some embodiments, component word combination machine learning model 156 may accept as inputs 2 words, 3 words, 4 words, or more. In some embodiments, the full component word set 140 is input into component word combination machine learning model 156. In some embodiments, a subset of component word set 140 is input component word combination machine learning model 156.

Still referring to FIG. 1, in some embodiments, processor 104 determines candidate name 160 and/or candidate name set 152. Using similar factors to those described above in the context of training a machine learning model using reinforcement learning, processor 104 may determine candidate name 160 and/or candidate name set 152 based on language rules, patterns, and the like. In a non-limiting example, processor 104 may generate multiple combination words, and may assess them based on factors such as whether they use descriptors in the correct order in relation to the descriptor's subject, whether prefixes and suffixes are in the correct location, whether impermissible letter combinations are used, and the like; in such an example, processor 104 may determine a word to be candidate name 160 if its assessment is better than a threshold, and/or is better than other assessed words.

Still referring to FIG. 1, in some embodiments, processor 104 may determine candidate name 160 as a function of a previously identified candidate name or component word. In some embodiments, processor may determine candidate name 160 as a function of a synonym of a previously identified candidate name or component word. In some embodiments, processor 104 may determine a synonym using a language processing model. In an embodiment, processor 104 may determine candidate name 160 as a function of a previously identified candidate name if intelligibility rating 176 and/or appeal rating 180 indicate low intelligibility and/or appeal. In a non-limiting example, processor 104 may generate a first candidate name, then processor 104 may analyze the first candidate name using intelligibility rating machine learning model 168, receiving a low intelligibility rating from intelligibility rating machine learning model 168, then processor 104 may identify one or more synonyms of a component word used to determine the first candidate name, then processor 104 may determine a second candidate name including the component word.

Still referring to FIG. 1, in some embodiments, processor 104 may generate candidate names by performing the following steps in a loop: 1. Identify a candidate name; 2. Determine whether the candidate name is suitable by analyzing its intelligibility and appeal as described herein; 3.1. If it is suitable, identify it as a name and end the loop; 3.2. If it is not suitable, identify a synonym of a component word used to determine the candidate name; 3.3. If it is not suitable, and there is no synonym of a component word used to determine the candidate name, then end the loop and determine a candidate name from component words determined from an attribute cluster, as described herein; 4. Determine a new candidate name, using the synonym as a component word, and restart the loop.

Still referring to FIG. 1, in some embodiments, apparatus 100 may identify a name using a name identification machine learning model 164. In some embodiments, apparatus 100 may include at least a processor 104 and memory 108 communicatively connected to the at least processor 104, the memory 108 containing instructions 112 configuring the at least processor 104 to identify a name using name identification machine learning model 164.

Still referring to FIG. 1, as used herein, a "name" is a word or short combination of words. In some embodiments, name identification machine learning model 164 may include an intelligibility rating machine learning model 168. In some embodiments, name identification machine learning model 164 may include an appeal rating machine learning model 172.

Still referring to FIG. 1, in some embodiments, apparatus 100 may identify a name by using intelligibility rating machine learning model 164 to generate an intelligibility rating 176 and determining a name as a function of intelligibility rating 176. In some embodiments, intelligibility rating machine learning model 164 may accept as an input a word and may output intelligibility rating 176.

Still referring to FIG. 1, in some embodiments, intelligibility rating machine learning model 164 may be trained using supervised learning. In some embodiments, intelligibility rating machine learning model 164 may be trained on a dataset including letter combinations associated with a measure of how intelligible the letter combination is. In a non-limiting example, a measure of how intelligible a letter combination is may be determined as a function of whether the letter combination forms a word in a dictionary, to what degree the letter combination forms a commonly used name, to what degree the letter combination follows language rules, to what degree the letter combination follows common language patterns, and/or to what degree a human rates the letter combination as being intelligible.

Still referring to FIG. 1, in some embodiments, intelligibility rating machine learning model 164 may be trained using reinforcement learning. In some embodiments, intelligibility rating machine learning model 164 may be trained to maximize or minimize a score assigned to intelligibility rating machine learning model 164 outputs. In some embodiments, intelligibility rating machine learning model 164 may be assigned a score based on a measure of how intelligible the output is. As with the description of training intelligibility rating machine learning model 164 using supervised learning, a measure of how intelligible an output is may be determined as a function of whether the output is a word in a dictionary, to what degree the output is a commonly used name, to what degree the output follows language rules, to what degree the output follows common language patterns, and/or to what degree a human rates the output as being intelligible.

Still referring to FIG. 1, in some embodiments, apparatus 100 may identify a name by using appeal rating machine learning model 172 to generate an appeal rating 180 and determining a name as a function of appeal rating 180. In some embodiments, appeal rating machine learning model 172 may accept as an input a word and may output appeal rating 180.

Still referring to FIG. 1, in some embodiments, appeal rating machine learning model 172 may be trained using supervised learning. In some embodiments, appeal rating machine learning model 172 may be trained on a dataset including letter combinations associated with a measure of how appealing the letter combination is. In a non-limiting example, a measure of how appealing a letter combination is may be determined as a function of ratings by humans of how appealing certain words, phrases, concepts, and the like are.

Still referring to FIG. 1, in some embodiments, appeal rating machine learning model 172 may be trained using reinforcement learning. In some embodiments, appeal rating machine learning model 172 may be trained to maximize or minimize a score assigned to appeal rating machine learning model 172 outputs. In some embodiments, appeal rating machine learning model 172 may be assigned a score based on a measure of how appealing the output is, which may be determined, in a non-limiting example, by using human ratings of how appealing certain words, phrases, concepts, and the like are.

Still referring to FIG. 1, in some embodiments, processor 104 may determine a name as a function of intelligibility rating 176 and/or appeal rating 180. In some embodiments, intelligibility rating 176 and/or appeal rating 180 may be compared to a threshold. In non-limiting examples, processor 104 may determine a name based on whether intelligibility rating 176 and/or appeal rating 180 are greater than a threshold, less than a threshold, or between a maximum and a minimum. In some embodiments, intelligibility rating 176 and appeal rating 180 may be compared to thresholds individually, in combination, or both. In a non-limiting example, processor 104 may be configured to determine candidate name 160 to be a name if intelligibility rating 176 is above a first threshold, and appeal rating 180 is above a second threshold. In another non-limiting example, processor 104 may be configured to determine candidate name 160 based on a function of both intelligibility rating 176 and appeal rating 180, such as a weighted sum of intelligibility rating 176 and appeal rating 180. In some embodiments, processor 104 may determine a name based on a comparison between the intelligibility ratings 176, appeal ratings 180, and/or a function of both for the candidate names 160 in candidate name set 152. In a non-limiting example, processor 104 may calculate a weighted sum of intelligibility rating 176 and appeal rating 180 for candidate names 160 in candidate name set 152, and may select a name based on which candidate name 160 has the greatest weighted sum. As described below, visual element data structures and visual elements 184 may also be determined as a function of intelligibility rating 176, appeal rating 180, and/or a function of both.

Still referring to FIG. 1, a datum described herein may be represented as a data structure. In some embodiments, a data structure may include one or more functions and/or variables, as a class might in object-oriented programming. In some embodiments, a data structure may include data in the form of a Boolean, integer, float, string, date, and the like. In a non-limiting example, a component word 148 data structure may include a string. In some embodiments, data in a data structure may be organized in a linked list, tree, array, matrix, tenser, and the like. In a non-limiting example, component word set 140 may include a list of strings, with each string representing a component word 148. In some embodiments, a data structure may include or be associated with one or more elements of metadata. A data structure may include one or more self-referencing data elements, which processor 104 may use in interpreting the data structure. In a non-limiting example, a data structure may include "<string>" and "</string>," tags, indicating that the content between the tags is a string.

Still referring to FIG. 1, a data structure may be stored in, for example, memory 108 or a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, a data structure may be read and/or manipulated by processor 104. In a non-limiting example, attribute 120 data structures may include strings describing those attributes, and these strings may be read by processor 104 and input into component word set machine learning model 144. In another non-limiting example, component word set machine learning model 144 may output a component word 148; processor 104 may then create component word set 140 and add component word 148 to it, or may add component word 148 to an existing component word set 140. In another non-limiting example, a candidate name 160 data structure may include a string representing the text of the candidate name, an integer representing an intelligibility rating 176, and an integer representing an appeal rating 180, and processor 104 may modify the integer representing the intelligibility rating 176 upon receiving an output from intelligibility rating machine learning model 168.

Still referring to FIG. 1, in some embodiments, a data structure may be calibrated. In some embodiments, a machine learning model described herein may be represented by a data structure, and that data structure may be trained using a machine learning algorithm. In a non-limiting example, a data structure may include an array of data representing the biases of connections of a neural network. In this example, the neural network may be trained on a set of training data, and a back propagation algorithm may be used to modify the data in the array.

Still referring to FIG. 1, in some embodiments, apparatus 100 may determine a visual element data structure as a function of a selected name. In some embodiments, apparatus 100 may include at least a processor 104 and memory 108 communicatively connected to the at least processor 104, the memory 108 containing instructions 112 configuring the at least processor 104 to determine a visual element data structure as a function of a selected name.

Still referring to FIG. 1, in some embodiments, a visual element data structure may include a visual element 184. In some embodiments, a visual element data structure may include a rule for displaying visual element 184. In some embodiments, a visual element data structure may be determined as a function of a selected name. In some embodiments, a visual element data structure may be determined as a function of an item from the list consisting of predetermined attribute list 132, entity data 128, attribute 120, attribute cluster 116, component word 148, component word set 140, candidate name 160, candidate name set 152, intelligibility rating 176, appeal rating 180, and a selected name. In a non-limiting example, a visual element data structure may be generated such that visual element 184 describing or highlighting a selected name is displayed to a user 188. In another non-limiting example, a visual element data structure may be generated such that component word 148 and/or component word set 140 is compared to component words associated with another entity. In a non-limiting example, a visual element data structure may be generated such that component word 148 is compared to a selected word. In a non-limiting example, a visual element data structure may be generated such that attribute cluster 116, component word set 140, and a selected word are presented to a user. Visual element 184 may include, for example, one or more elements of text, images, shapes, charts, particle effects, interactable features, and the like. In a non-limiting example, visual element 184 may include a description of an entity in text, and a selected name in text. In a non-limiting example, visual element 184 may include text describing an attribute cluster 116, the selected name in text, and a particle effect around the text of the selected name. In a non-limiting example, visual element 184 may include images depicting a plurality of entities, and text describing component words associated with those entities.

Still referring to FIG. 1, a visual element data structure may include rules governing if or when visual element 184 is displayed. In a non-limiting example, a visual element data structure may include a rule causing a visual element 184 describing candidate name 160 to be displayed when a user selects candidate name 160 using a GUI.

Still referring to FIG. 1, a visual element data structure may include rules for presenting more than one visual element 184, or more than one visual element 184 at a time. In an embodiment, about 1, 2, 3, 4, 5, 10, 20, or 50 visual elements 184 are displayed simultaneously.

Still referring to FIG. 1, a visual element data structure rule may apply to a single visual element 184 or datum, or to more than one visual element 184 or datum. A visual element data structure may categorize data into one or more categories and may apply a rule to all data in a category, to all data in an intersection of categories, or all data in a subsection of a category (such as all data in a first category and not in a second category). In a non-limiting example, a visual element data structure may categorize attributes 120 according to whether they are members of a particular attribute cluster 116 or not. A visual element data structure may rank data or assign numerical values to them. In a non-limiting example, a visual element data structure may rank candidate names 160 by their intelligibility ratings 176. A numerical value may, for example, measure the degree to which a first datum is associated with a category or with a second datum. In a non-limiting example, a numerical value may measure the degree to which attribute 120 is associated with a particular attribute cluster 116. A visual element data structure may apply rules based on a comparison between a ranking or numerical value and a threshold. In a non-limiting example, a visual element data structure may apply a highlighting effect to all attributes 120 associated with a particular attribute cluster 116. Rankings, numerical values, categories, and the like may be used to set visual element data structure rules. Similarly, rankings, numerical values, categories, and the like may be applied to visual elements, and visual elements may be applied based on them. In a non-limiting example, user 188 may select attribute cluster 116, and visual element 184 highlighting all attributes 120 associated with attribute cluster 116 may be displayed.

Still referring to FIG. 1, in some embodiments, visual element 184 may be interacted with. For example, visual element 184 may include an interface, such as a button or menu. In some embodiments, visual element 184 may be interacted with using a user device such as a smartphone.

Still referring to FIG. 1, in some embodiments, apparatus 100 may determine visual element 184. In some embodiments, apparatus 100 may include at least a processor 104 and a memory 108 communicatively connected to the at least processor 104, the memory 108 containing instructions 112 configuring the at least processor 104 to determine visual element 184.

Still referring to FIG. 1, in some embodiments, apparatus 100 may display visual element 184 to user 188. In some embodiments, apparatus 100 may include at least a processor 104 and a memory 108 communicatively connected to the at least processor 104, the memory 108 containing instructions 112 configuring the at least processor 104 to display visual element 184 to user 188.

Still referring to FIG. 1, in some embodiments, apparatus 100 may transmit visual element 184 to a display. A display may communicate visual element 184 to user 188. A display may include, for example, a smartphone screen, a computer screen, or a tablet screen. A display may be configured to provide a visual interface. A visual interface may include one or more virtual interactive elements such as, without limitation, buttons, menus, and the like. A display may include one or more physical interactive elements, such as buttons, a computer mouse, or a touchscreen, that allow user 188 to input data into the display. Interactive elements may be configured to enable interaction between a user and a computing device. In some embodiments, a visual element data structure is determined as a function of data input by user 188 into a display.

Figure 2:
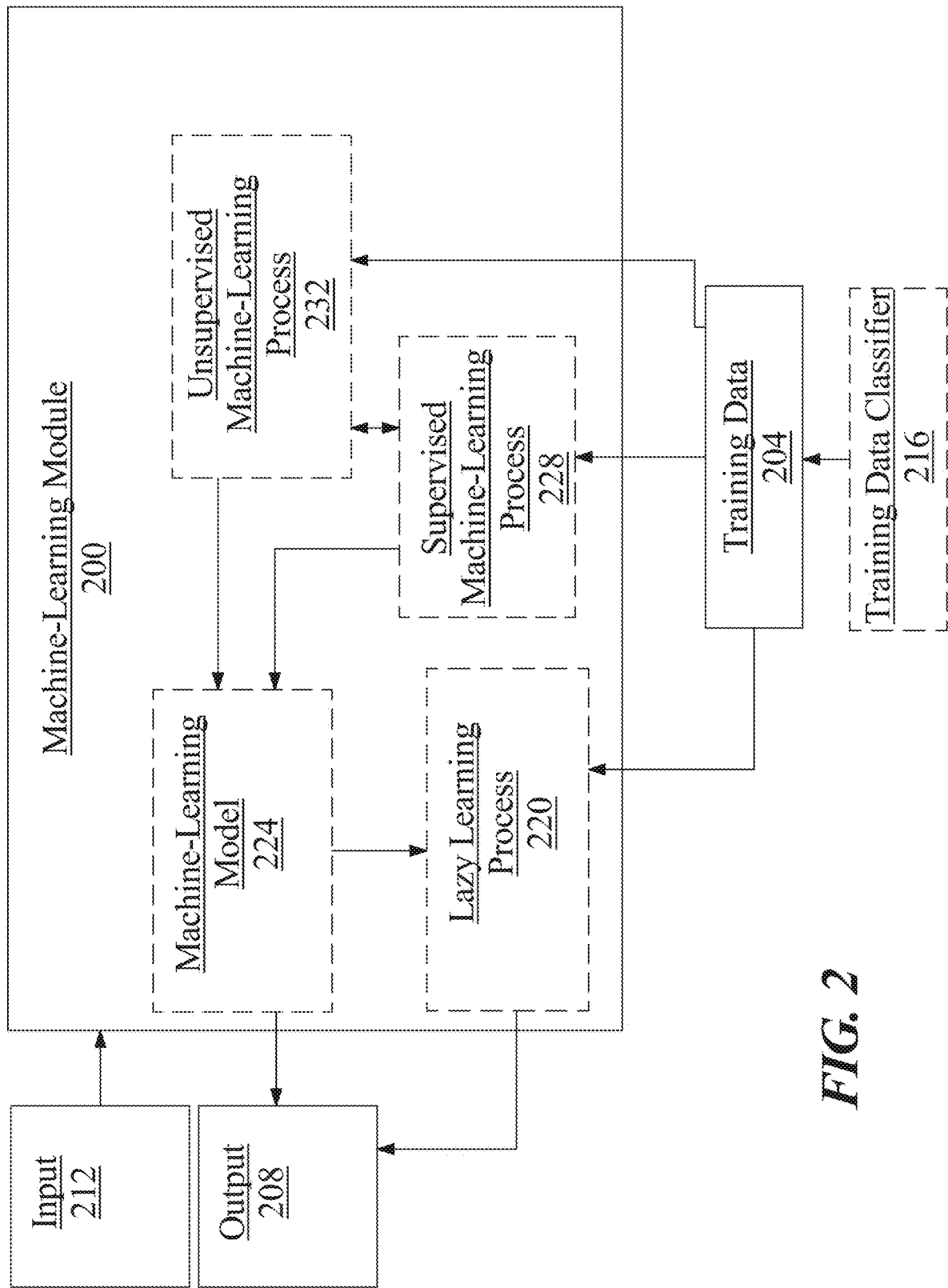
FIG. 2 is a diagram depicting a machine learning model.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, an input may be candidate name 160 and output may be intelligibility rating 176.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify attributes 120 to attribute clusters 116.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include attributes 120 as described above as inputs, attribute clusters 116 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 3:
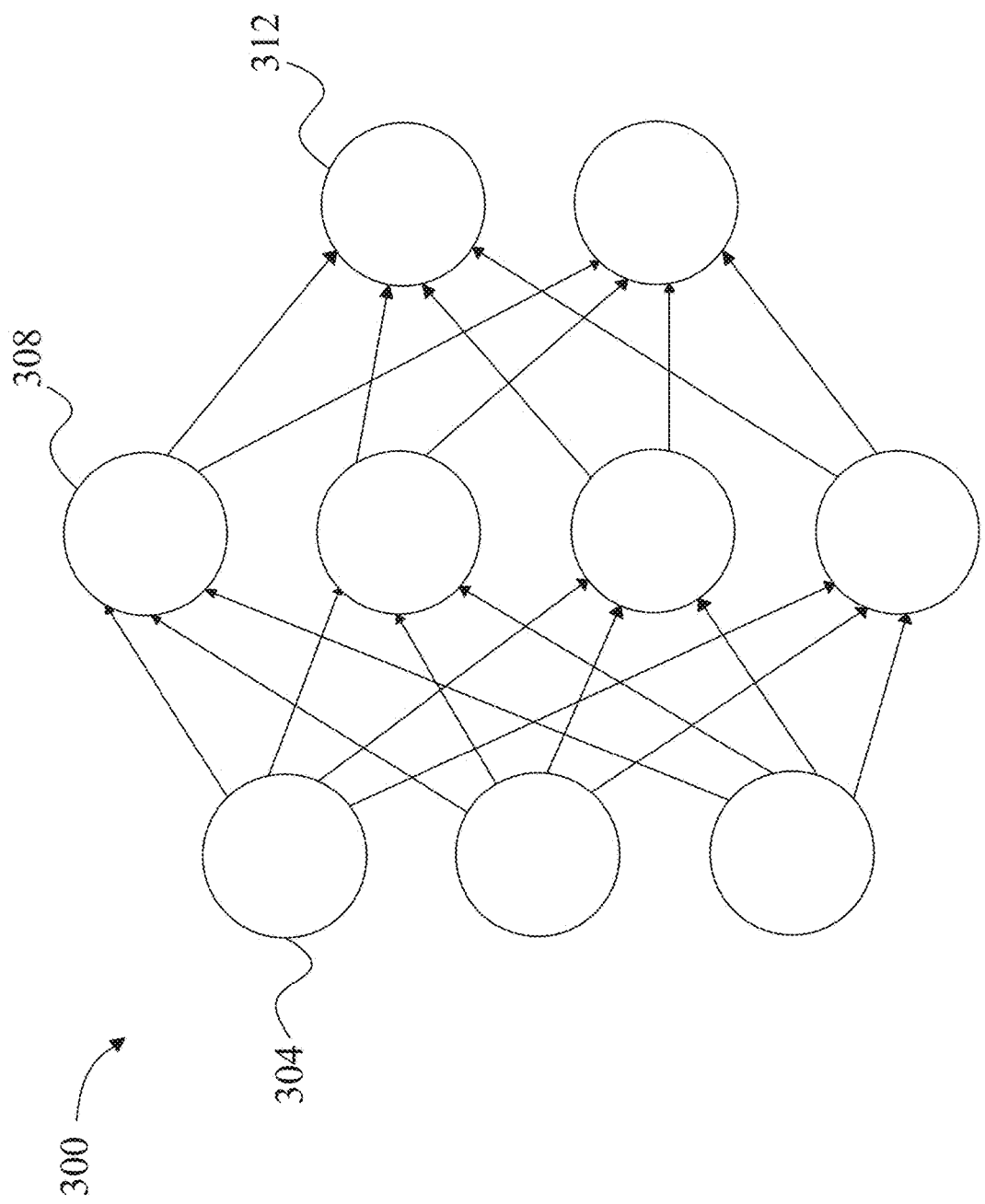
FIG. 3 is a diagram depicting a neural network.

Referring now to FIG. 3, an exemplary embodiment of neural network 300 is illustrated. A neural network 300, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
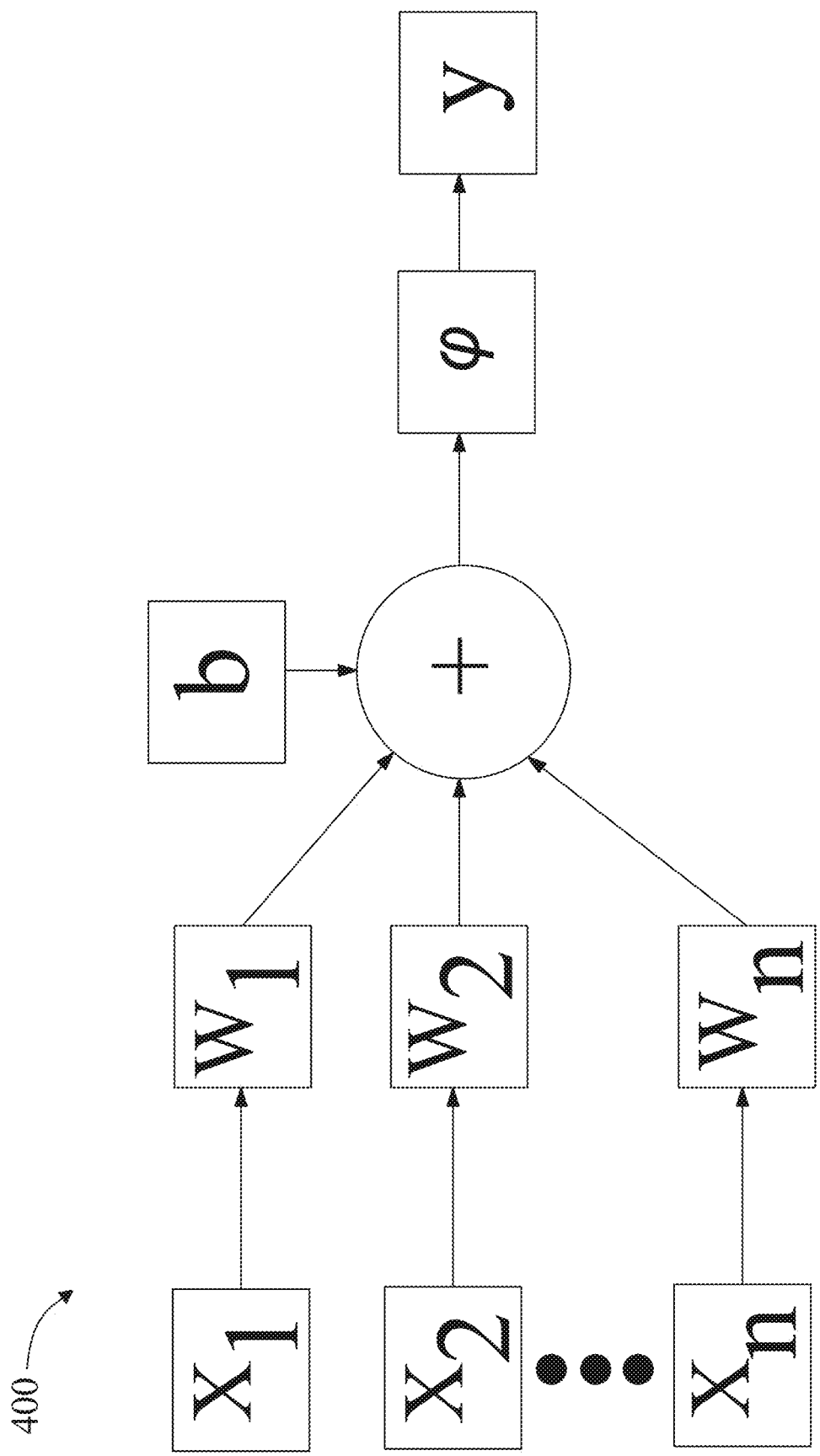
FIG. 4 is a diagram depicting a neural network node.

Referring now to FIG. 4, an exemplary embodiment of a node 400 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as ƒ(x)=tanh²(x), a rectified linear unit function such as ƒ(x)=max(0, x), a "leaky" and/or "parametric" rectified linear unit function such as ƒ(x)=max (ax, x) for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as ƒ(x)=x*sigmoid(x), a Gaussian error linear unit function such as f(x)=a(1+tanh($\sqrt{2/\pi}$(x+bx^r))) for some values of a, b, and r, and/or a scaled exponential linear unit function such as $$f(x) = \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
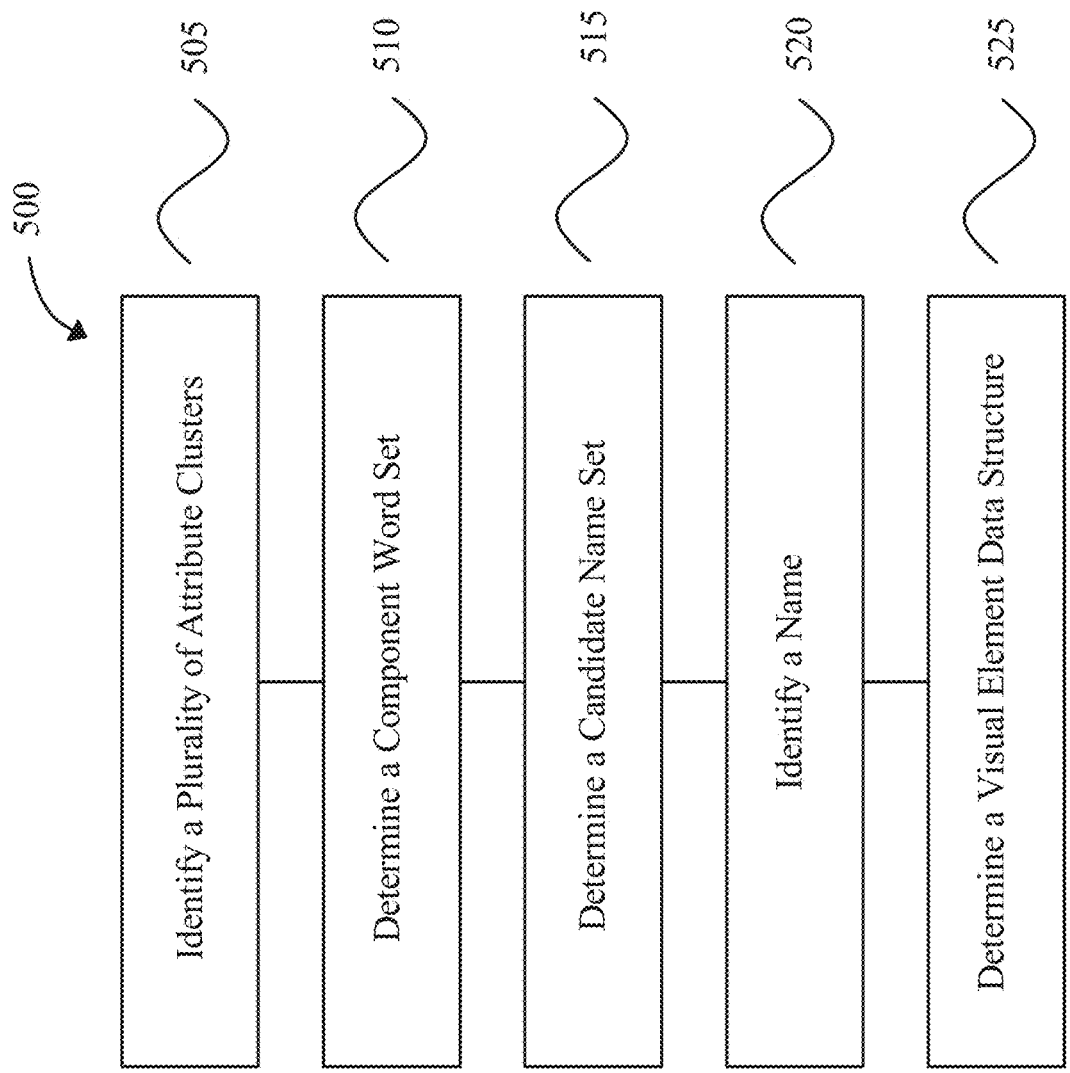
FIG. 5 is a diagram depicting a method of identifying a name.

Now referring to FIG. 5, method of identifying a name 500 is disclosed. Method 500 may include identifying a plurality of attribute clusters 505. In some embodiments, a plurality of attribute clusters may be identified as a function of entity data. In some embodiments, identifying an attribute cluster may include identifying entity data, inputting entity data into an attribute classifier, and receiving a plurality of attributes from attribute classifier. In some embodiments, identifying an attribute cluster may include inputting a plurality of attributes into a clustering algorithm, and receiving an attribute cluster from the clustering algorithm. Method 500 may include determining a component word set 510. In some embodiments, determining a component word set may be done as a function of an attribute cluster. In some embodiments, determining a component word set may be done using a component word set machine learning model. In some embodiments, determining a component word set may be done by inputting an attribute cluster into component word set machine learning model, inputting a predetermined word into component word set machine learning model, receiving from component word set machine learning model an association rating, and determining whether to include predetermined word in the component word set as a function of the association rating. Method 500 may include determining a candidate name set 515. In some embodiments, determining a candidate name set may include inputting at least a subset of component word set into a component word combination machine learning model and receiving a candidate name from the component word combination machine learning model. Method 500 may include identifying a name 520. In some embodiments, a name may be identified from a candidate name set. In some embodiments, a name may be identified using a name identification machine learning model. In some embodiments, identifying a name may include inputting a candidate name into an intelligibility rating machine learning model, receiving an intelligibility rating from the intelligibility rating machine learning model, and identifying a name from candidate name set as a function of the intelligibility rating. In some embodiments, identifying a name may include inputting a candidate name into an appeal rating machine learning model, receiving an appeal rating from the appeal rating machine learning model, and identifying a name from candidate name set as a function of the appeal rating. In some embodiments, identifying a name may include inputting a candidate name into an intelligibility rating machine learning model, receiving an intelligibility rating from the intelligibility rating machine learning model, inputting a candidate name into an appeal rating machine learning model, receiving an appeal rating from the appeal rating machine learning model, and identifying a name from candidate name set as a function of the intelligibility rating and the appeal rating. Method 500 may include determining a visual element data structure 525. In an embodiment, method 500 may further include determining a visual element, and displaying the visual element to a user. In some embodiments, a name may be a portmanteau. In some embodiments, one or more steps of a method may be done using at least a processor. In some embodiments, one or more steps of a method may be done as described with reference to another figure herein.

Figure 6:
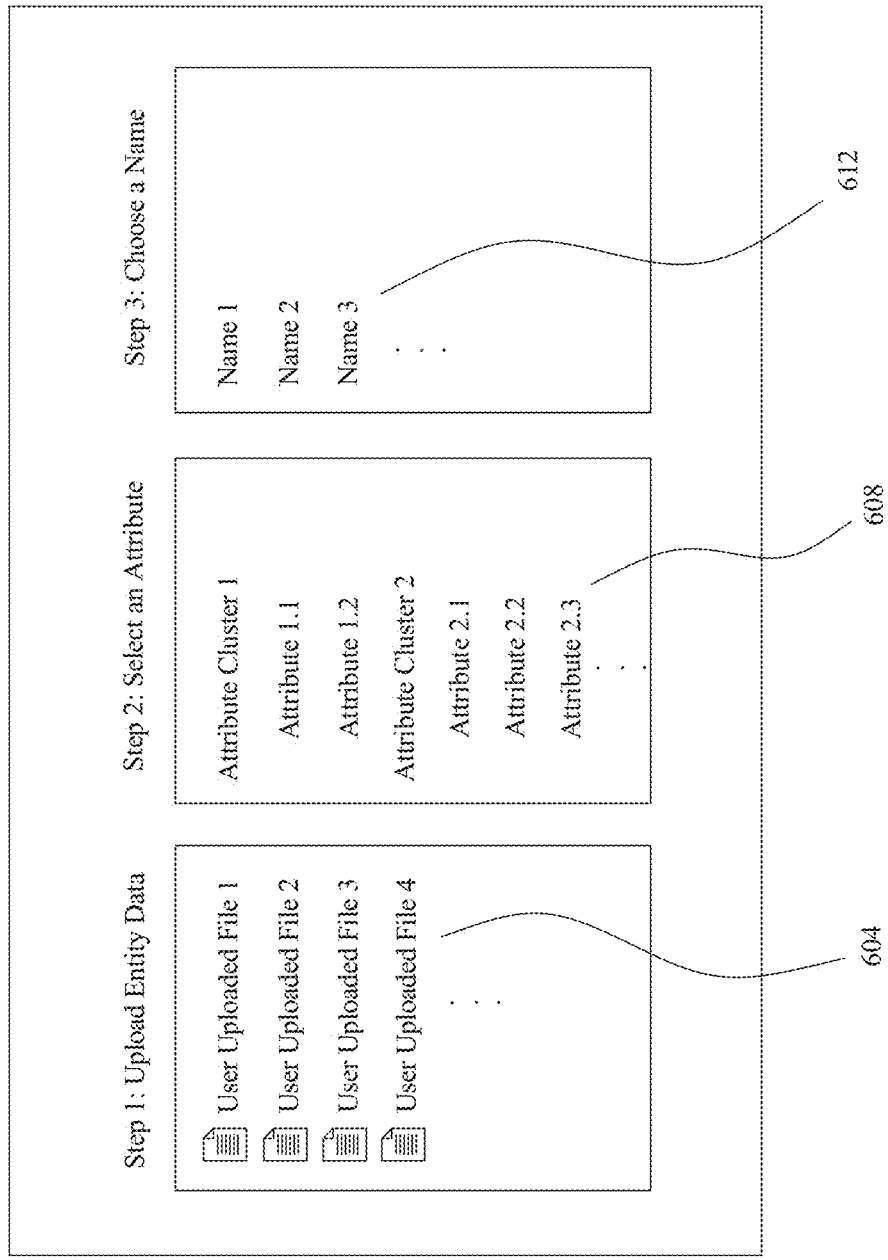
FIG. 6 is an illustration of an exemplary graphical user interface.

Now referring to FIG. 6, a non-limiting example of one or more GUI elements is illustrated. In some embodiments, GUI 600, and/or one or more elements of GUI 600 may be displayed on a user device. GUI elements may include, without limitation, a field for inputting entity data 604, a field for selecting an attribute and/or attribute cluster 608, and a field displaying one or more names determined by apparatus 100. In some embodiments, processor 104 may transmit to a user device a data structure that configures the user device to display GUI 600 and/or one or more elements of GUI 600; in some embodiments, such a data structure may include a visual element data structure.

Still referring to FIG. 6, in some embodiments, GUI 600 may include a field for inputting entity data 604. In some embodiments, field 604 may accept user inputs of entity data in the form of files, such as text files. In some embodiments, a user may "drag and drop" a file into field 604 in order to upload the file. In some embodiments, a user may directly input entity data into field 604, such as by pasting text into the field. In some embodiments, entity data 128 may be input into field 604.

Still referring to FIG. 6, in some embodiments, GUI 600 may include a field for selecting an attribute and/or attribute cluster 608. In some embodiments, the contents of field 608 may be automatically generated and displayed to a user in field 608 as a function of user data 128 input into field 604. In some embodiments, field 608 includes attributes and/or attribute clusters associated with entity data 128. In some embodiments, attributes in field 608 are organized by attribute cluster. In some embodiments, a user may select an item in field 608 by clicking on it. In some embodiments, a user selection of an item in field 608 may cause it to become highlighted. In some embodiments, items automatically populated into field 608 may be ordered according to a measure of their uniqueness in comparison to attributes and/or attribute clusters of other entities.

Still referring to FIG. 6, in some embodiments, GUI 600 may include a field displaying one or more names 612. In some embodiments, apparatus 100 may populate field 612 as a function of a selection of an attribute and/or attribute cluster by a user in field 608. In some embodiments, intelligibility rating 176, appeal rating 180, or both, are displayed such that they are associated with a name in field 612.

Still referring to FIG. 6, in some embodiments, a computing device may display and/or configure a user device to display GUI 600 and/or may display and/or configure a user device to display a change in GUI 600 as a result of an event. In some embodiments, a computing device displaying and/or configuring a user device to display GUI 600 may produce a signal when an event occurs, and the computing device may modify GUI 600 as a result of the signal. Events may include, in non-limiting examples, a user hovering the cursor over an element, a user clicking on an element, a user pressing a key on a keyboard, a video ending, a user scrolling a mouse wheel, an error occurring, and the like. In some embodiment, a computing device may include event handler code that runs when an event occurs, causing a change in GUI 600. As non-limiting examples, events may result in a request being sent to an API, playing an animation, copying data to the clipboard, and entering full screen mode. As a non-limiting example, an event may include clicking on an attribute in field 608, and this may cause event handler code to cause the computing device to identify one or more names associated with that attribute, and display them in field 612.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
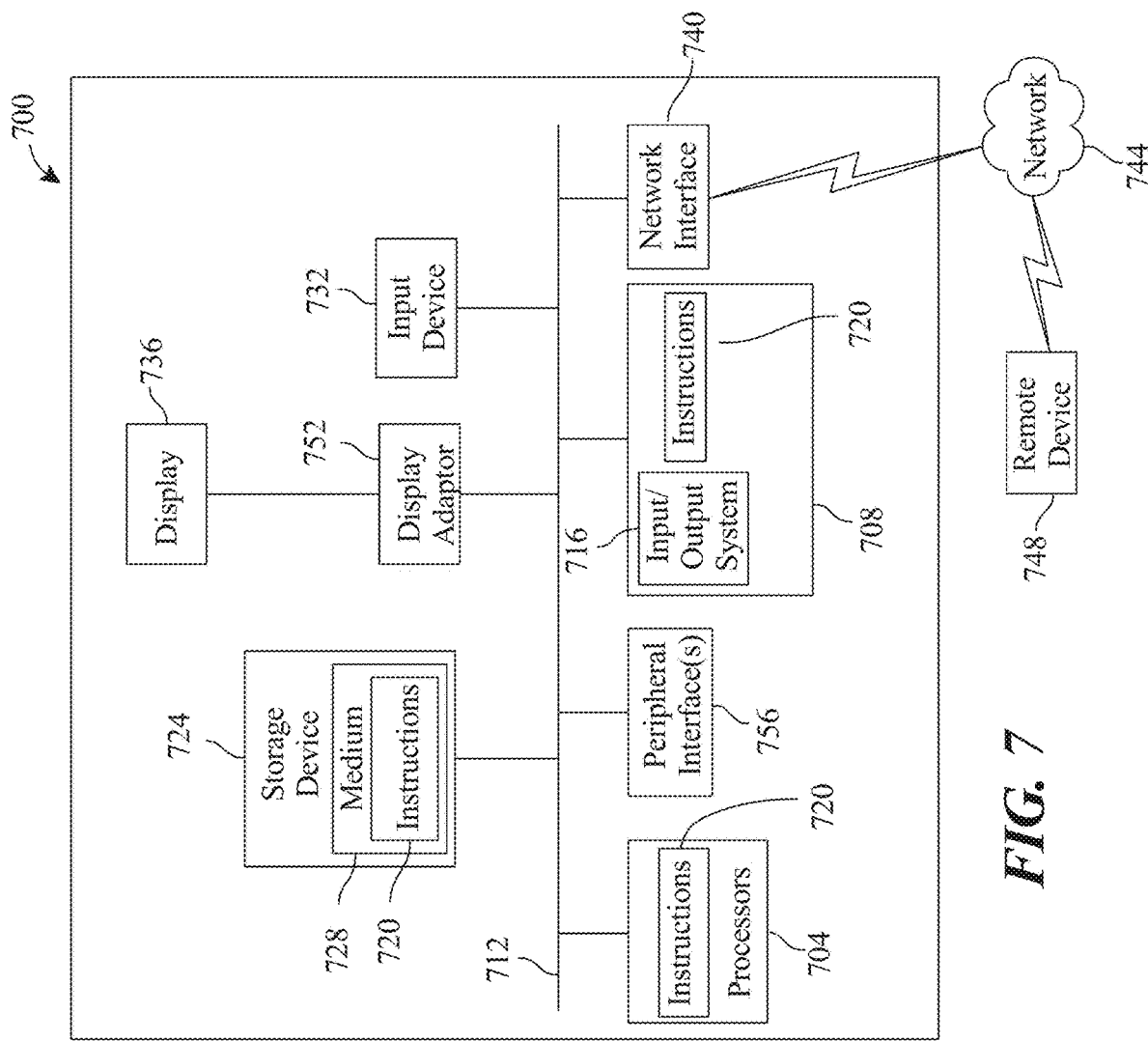
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for identifying a name, the apparatus comprising:
   at least a processor; and
   a memory communicatively connected to the at least processor, the memory containing instructions configuring the at least processor to:

identify a plurality of attributes wherein identifying the plurality of attributes comprises:
  identifying entity data using a web crawler trained to scrape the entity data from entity related platforms;
  training an attribute classifier with training data comprising historical entity data correlated to historical attributes
  inputting the entity data into the attribute classifier; and
  outputting, using the attribute classifier, a plurality of attributes;
identify an attribute cluster using the plurality of attributes and an unsupervised clustering algorithm, wherein:
  identifying the attribute cluster comprises identifying an outlier cluster; and locating in the plurality of attribute clusters an outlier cluster comprises:
    identifying a target process;
    inputting the target process into an impact metric machine learning model;
    inputting an attribute cluster into an impact metric machine learning model;
    receiving an impact metric from the impact metric machine learning model; and
    determining an outlier cluster as a function of an impact metric;
determine a component word set as a function of an attribute cluster, using a component word set machine learning model, wherein the component word set comprises is at least one word with a desired level of relatedness with respect to the attribute cluster;
determine a candidate name set as a function of the component word set;
identify a name from the candidate name set, using a name identification machine learning model; and
determine a visual element data structure as a function of the name.

2. The apparatus of claim 1, wherein identifying an attribute cluster comprises:
  inputting a plurality of attributes into a clustering algorithm; and
  receiving an attribute cluster from the clustering algorithm.

3. The apparatus of claim 1, wherein determining a component word set as a function of the attribute cluster, using a component word set machine learning model comprises:
  inputting an attribute cluster into the component word set machine learning model;
  inputting a predetermined word into the component word set machine learning model;
  receiving from the component word set machine learning model an association rating; and
  determining whether to include the predetermined word in the component word set as a function of the association rating.

4. The apparatus of claim 1, wherein determining a candidate name set as a function of the component word set comprises:
  inputting at least a subset of the component word set into a component word combination machine learning model; and
  receiving a candidate name from the component word combination machine learning model.

5. The apparatus of claim 1, wherein identifying a name from the candidate name set using a name identification machine learning model comprises:
  inputting a candidate name into an intelligibility rating machine learning model;
  receiving an intelligibility rating from the intelligibility rating machine learning model; and
  identifying a name from the candidate name set as a function of the intelligibility rating.

6. The apparatus of claim 1, wherein identifying a name from the candidate name set using a name identification machine learning model comprises:
  inputting a candidate name into an appeal rating machine learning model;
  receiving an appeal rating from the appeal rating machine learning model; and
  identifying a name from the candidate name set as a function of the appeal rating.

7. The apparatus of claim 1, wherein identifying a name from the candidate name set using a name identification machine learning model comprises:
  inputting a candidate name into an intelligibility rating machine learning model;
  receiving an intelligibility rating from the intelligibility rating machine learning model;
  inputting a candidate name into an appeal rating machine learning model;
  receiving an appeal rating from the appeal rating machine learning model; and
  identifying a name from the candidate name set as a function of the intelligibility rating, and the appeal rating.

8. The apparatus of claim 1, wherein the memory contains instructions configuring the at least processor to:
  determine a visual element as a function of the visual element data structure; and
  display the visual element to a user.

9. The apparatus of claim 1, wherein the name is a portmanteau.

10. A method of identifying a name, the method comprising:
  using at least a processor, identifying a plurality of attributes wherein identifying the plurality of attributes comprises:
    identifying entity data using a web crawler trained to scrape the entity data from entity related platforms;
    training an attribute classifier with training data comprising historical entity data correlated to historical attributes;
    inputting the entity data into the attribute classifier; and
    outputting, using the attribute classifier, a plurality of attributes;
  using at least a processor, identifying an attribute cluster using the plurality of attributes and an unsupervised clustering algorithm, wherein:
    identifying the attribute cluster comprises identifying an outlier cluster; and
    locating in the plurality of attribute clusters an outlier cluster comprises:
      identifying a target process;
      inputting the target process into an impact metric machine learning model;
      inputting an attribute cluster into an impact metric machine learning model;
      receiving an impact metric from the impact metric machine learning model; and determining an outlier cluster as a function of an impact metric;

using at least a processor, determining a component word set as a function of the attribute cluster, using a component word set machine learning model, wherein the component word set comprises is at least one word with a desired level of relatedness with respect to the attribute cluster;

using at least a processor, determining a candidate name set as a function of the component word set; and using at least a processor, identifying a name from the candidate name set, using a name identification machine learning model; and using at least a processor, determining a visual element data structure as a function of the name.

11. The method of claim 10, wherein identifying an attribute cluster comprises:

using at least a processor, inputting a plurality of attributes into a clustering algorithm; and using at least a processor, receiving an attribute cluster from the clustering algorithm.

12. The method of claim 10, wherein determining a component word set as a function of the attribute cluster, using a component word set machine learning model comprises:

using at least a processor, inputting an attribute cluster into the component word set machine learning model;

using at least a processor, inputting a predetermined word into the component word set machine learning model;

using at least a processor, receiving from the component word set machine learning model an association rating; and using at least a processor, determining whether to include the predetermined word in the component word set as a function of the association rating.

13. The method of claim 10, wherein determining a candidate name set as a function of the component word set comprises:

using at least a processor, inputting at least a subset of the component word set into a component word combination machine learning model; and using at least a processor, receiving a candidate name from the component word combination machine learning model.

14. The method of claim 10, wherein identifying a name from the candidate name set using a name identification machine learning model comprises:

using at least a processor, inputting a candidate name into an intelligibility rating machine learning model;

using at least a processor, receiving an intelligibility rating from the intelligibility rating machine learning model; and using at least a processor, identifying a name from the candidate name set as a function of the intelligibility rating.

15. The method of claim 10, wherein identifying a name from the candidate name set using a name identification machine learning model comprises:

using at least a processor, inputting a candidate name into an appeal rating machine learning model;

using at least a processor, receiving an appeal rating from the appeal rating machine learning model; and using at least a processor, identifying a name from the candidate name set as a function of the appeal rating.

16. The method of claim 10, wherein identifying a name from the candidate name set using a name identification machine learning model comprises:

using at least a processor, inputting a candidate name into an intelligibility rating machine learning model;

using at least a processor, receiving an intelligibility rating from the intelligibility rating machine learning model;

using at least a processor, inputting a candidate name into an appeal rating machine learning model;

using at least a processor, receiving an appeal rating from the appeal rating machine learning model; and using at least a processor, identifying a name from the candidate name set as a function of the intelligibility rating, and the appeal rating.

17. The method of claim 10, further comprising:

using at least a processor, determining a visual element as a function of the visual element data structure; and using at least a processor, displaying the visual element to a user.

18. The method of claim 10, wherein the name is a portmanteau.

* * * * *